(12) United States Patent
Ebrahimi et al.

(10) Patent No.: US 7,904,951 B1
(45) Date of Patent: Mar. 8, 2011

(54) TECHNIQUES FOR SECURELY ACCELERATING EXTERNAL DOMAINS LOCALLY

(75) Inventors: Hashem Mohammad Ebrahimi, Salt Lake City, UT (US); Baber Amin, Provo, UT (US); Mark D. Ackerman, Eagle Mountain, UT (US)

(73) Assignee: Novell, Inc., Provo, UT (US)

( * ) Notice: Subject to any disclaimer, the term of this patent is extended or adjusted under 35 U.S.C. 154(b) by 955 days.

(21) Appl. No.: 10/814,983

(22) Filed: Mar. 31, 2004

Related U.S. Application Data (60) Continuation-in-part of application No. 10/784,440, filed on Feb. 23, 2004, which is a continuation-in-part of application No. 10/650,211, filed on Aug. 28, 2003, now Pat. No. 6,950,936, which is a continuation of application No. 09/493,506, filed on Jan. 28, 2000, now Pat. No. 6,640,302, which is a division of application No. 09/268,795, filed on Mar. 16, 1999, now Pat. No. 6,081,900.

(51) Int. Cl.
*H04L 9/00* (2006.01)
(52) U.S. Cl. .................... 726/12; 713/153; 713/156
(58) Field of Classification Search .............. 726/12, 726/14; 713/151, 153, 156; 380/255
See application file for complete search history.

(56) References Cited

U.S. PATENT DOCUMENTS

| | | | |
|---|---|---|---|
| 5,550,984 A | 8/1996 | Gelb | |
| 5,553,239 A | 9/1996 | Heath et al. | |
| 5,657,390 A | 8/1997 | Elgamal et al. | 380/49 |
| 5,673,322 A | 9/1997 | Pepe et al. | 380/49 |
| 5,757,924 A | 5/1998 | Friedman et al. | 380/49 |
| 5,768,271 A | 6/1998 | Seid et al. | 370/389 |
| 5,805,803 A | 9/1998 | Birrell et al. | |
| 5,825,890 A | 10/1998 | Elgalmal et al. | 380/49 |
| 5,889,996 A | 3/1999 | Adams | 717/139 |
| 5,913,025 A | 6/1999 | Higley et al. | |
| 5,963,915 A | 10/1999 | Kirsch | 705/26 |
| 5,991,810 A | 11/1999 | Shapiro et al. | 709/229 |
| 6,003,084 A * | 12/1999 | Green et al. | 709/227 |

(Continued)

FOREIGN PATENT DOCUMENTS

WO  WO 02102020 A1 * 12/2002

OTHER PUBLICATIONS

E. Cohen et al. "Improving End-to-End Performance of the Web Using Server Volumes and Proxy Filters" Proceedings of the ACM SIGCOMM '98 conference on Applications, technologies, architectures, and protocols for computer communication SIGCOMM '98, vol. 28 Issue 4 © 1998 ACM.*

(Continued)

*Primary Examiner* — Kimyen Vu
*Assistant Examiner* — Thomas Gyorfi
(74) *Attorney, Agent, or Firm* — Schwegman, Lundberg & Woessner, P.A.

(57) ABSTRACT

Techniques are provided for securely accelerating external domains locally. Secure client requests directed to an external domain are forwarded to a local domain accelerator. The local domain accelerator communicates securely with the client as if it were the external domain. The local domain accelerator communicates securely with the external domain and acquires data to service the client requests within a local cache. The data is vended from the local cache via secure communications made to the client.

18 Claims, 3 Drawing Sheets

U.S. PATENT DOCUMENTS

| | | | |
|---|---|---|---|
| 6,029,245 A | 2/2000 | Scanlan | 705/26 |
| 6,065,120 A | 5/2000 | Laursen et al. | |
| 6,081,900 A | 6/2000 | Subramaniam et al. | |
| 6,112,228 A | 8/2000 | Earl et al. | 709/205 |
| 6,128,644 A | 10/2000 | Nozaki | |
| 6,148,405 A | 11/2000 | Liao et al. | |
| 6,192,477 B1 | 2/2001 | Corthell | 713/201 |
| 6,199,165 B1 | 3/2001 | Grunner | 713/201 |
| 6,233,577 B1 | 5/2001 | Ramasubramani et al. | |
| 6,233,608 B1 | 5/2001 | Laursen et al. | |
| 6,263,437 B1 | 7/2001 | Liao et al. | |
| 6,324,648 B1 | 11/2001 | Grantges, Jr. | |
| 6,434,687 B1 | 8/2002 | Huppenthal | 712/32 |
| 6,473,800 B1 | 10/2002 | Jerger et al. | |
| 6,513,061 B1 | 1/2003 | Ebata et al. | |
| 6,584,567 B1 | 6/2003 | Bellwood et al. | |
| 6,640,302 B1 | 10/2003 | Subramaniam et al. | |
| 6,643,701 B1 | 11/2003 | Aziz et al. | |
| 6,665,721 B1 | 12/2003 | Hind et al. | 709/227 |
| 6,732,269 B1 * | 5/2004 | Baskey et al. | 713/153 |
| 6,745,229 B1 | 6/2004 | Gobin et al. | |
| 6,950,936 B2 | 9/2005 | Subramaniam et al. | |
| 6,961,759 B2 | 11/2005 | Brown et al. | |
| 7,007,299 B2 | 2/2006 | Ioele et al. | |
| 7,093,121 B2 | 8/2006 | Barton et al. | |
| 7,137,143 B2 | 11/2006 | Chawla et al. | |
| 7,370,351 B1 | 5/2008 | Ramachandran et al. | |
| 7,430,757 B1 * | 9/2008 | Chari et al. | 726/4 |
| 7,552,223 B1 * | 6/2009 | Ackaouy et al. | 709/229 |
| 2002/0056033 A1 | 5/2002 | Huppenthal | 712/15 |
| 2002/0068554 A1 | 6/2002 | Dusse | |
| 2002/0199098 A1 * | 12/2002 | Davis | 713/160 |
| 2003/0061387 A1 | 3/2003 | Brown et al. | |
| 2003/0131259 A1 | 7/2003 | Barton et al. | |
| 2003/0167403 A1 * | 9/2003 | McCurley et al. | 713/201 |
| 2003/0208570 A1 | 11/2003 | Lapidous | |
| 2004/0015725 A1 | 1/2004 | Boneh et al. | |
| 2004/0073629 A1 | 4/2004 | Bazot et al. | |

OTHER PUBLICATIONS

T. Dierks et al. "RFC2246: The TLS Protocol Version 1.0" © 1999 The Internet Society. pp. 1-80.*
Appel, Shannon. "[SSL-Talk List FAQ] Secure Sockets Layer Discussion List FAQ v1.1.1" Published Nov. 16, 1998 (22 pages.) http://www.faqs.org/faqs/computer-security/ssl-talk-faq/.*
Luotonen, Ari. "Tunneling TCP based protocols through Web proxy servers" Published Aug. 1998 (9 pages) http://tools.ietf.org/id/draft-luotonen-web-proxy-tunneling-01.txt.*
Elgamal, Taher. "The Secure Sockets Layer Protocol (SSL)" Published Apr. 1995. http://www3.ietf.org/proceedings/95apr/sec/cat.elgamal.slides.html.*
Dierks, Tim. "Modifications to the SSL protocol for TLS <draft-ietf-tls-ssl-mods-00.txt>" Published Nov. 26, 1996. http://www3.tools.ietf.org/html/draft-ietf-tls-ssl-mods-00.*
Rabinovich, Michael et al. "Web Caching and Replication" © 2001 Addison Wesley Professional. Chapters 7 & 8 (pp. 60-92).*
"A New Management and Security Architechture for Extranets", http://www.aventail.com/index.phtml/solutions/white_papers/aec_wp.phtml, (1196-1999),1-14.
"CMS Proxy Server—White Paper", http://csm.alcyonis.fr/proxies.htm, (1995-1998),1-13.
"CSM Proxy Server, the Ultimate Gateway to the Internet!", http://www.csm-usa.com/white/gateway.htm, no. later than Aug. 4, 1998,1-5.
"How the Proxy Works", http://gopher.texshare.utexas.edu/Current/AccessMeet/accessproxy/how.html, (Jul. 22, 1998),1-2.
"Info needed to write https proxy", http://www.netsys.com/firewalls-9604/0406.html (Apr. 11, 1996),1.
"Microsoft Proxy Server", http://www/microsoft.com/proxy/guide/whatsnew.asp?a=2&B=1, no later than Aug. 4, 1998,1-4.
"*Microsoft Proxy Server* vs. *Border Manager*", http://microsoft.com/proxy/comparisons/bulletin.asp?A=4&B=4, (1998), 1-8.
"NetSafteV3.0 The Firewall Solution from Siemens Nixdorf", http://www.swn.sni.be/NetSafe.htm, May 31, 1997 ,1-3.
"Netscpe Proxy Server Administrator's Guide Version 3.5 for Unix", http://developer.netscape.com/docs/manuals/proxy/adminux//contents.htm, (1997).
"OWF Basics", http://www.omnigroup.com/MailArchive/OmniWeb-dev/Current/0002.html, (1997), 1-2.
"r3 CypherClient", http://www.r3.ch/products/cypher/cypherclient.html, (1998), 1-4.
"Submission: HTTPs v1.0 PAckage for OmniWeb 3x (Rhapsody)", http://www.plsys.co.uk.MailingLists/uk-next-announce.msg00251.html, (Jan. 24, 1998).
"Virtual Private Networking: An Overview", Microsoft http://www.microsoft.com/workshop/sever/feature/vpnovw.asp, no. later than Feb. 25, 1998.
"Webroute 1.3.0", http://www-miaif.lip6.fr/willy/pub/webroute/v1.3/untared/CHANGES, (1997),1-2.
Elgamal, Taher, et al., "Securing Communications on the Intranet and Over the Internet", http://www.netscape.com/newsref/ref/128bit.html, (Jul. 1996), 1-12.
Feibel, Werner, "Novell's Complete Encyclopedia of Netwoking", San Jose, CA: Alameda, CA: *Novell Press; Sybex*, (1995),625-630.
Ferguson, Paul, et al., "What is a VPN?", *Ferguson & Huston, Revision 1*, (Apr. 1998), 1-22.
Schneider, Bruce, "Applied Cryptography Protocols, Algorithms, and Source Code in C", *New York: Wiley*, (1994),436-437.
Tanenbaum, Andrew S., "Computer Networks", *Upper Saddle River, N.J.: Prentice Hall PTR, 3d Edition*, (1996),28-29, 396-417, 601-621, and 681-695.
Zhong, Qun, et al., "Security Control for COTS Components", *Computer*, 31(6), (Jun. 1998),67-73.
"U.S. Appl. No. 09/493,506 Advisory Action mailed Oct. 25, 2002", 3 pgs.
"U.S. Appl. No. 09/493,506 Advisory Action mailed Nov. 30, 2001", 3 pgs.
"U.S. Appl. No. 09/493,506 Final Office Action mailed Jan. 30, 2001", 7 pgs.
"U.S. Appl. No. 09/493,506 Final Office Action mailed Mar. 18, 2003", 7 pgs.
"U.S. Appl. No. 09/493,506 Final Office Action mailed Aug. 12, 2002", 9 pgs.
"U.S. Appl. No. 09/493,506 Non Final Office Action mailed Mar. 26, 2002", 8 pgs.
"U.S. Appl. No. 09/493,506 Non Final Office Action mailed Sep. 15, 2000", 8 pgs.
"U.S. Appl. No. 09/493,506 Non Final Office Action mailed Nov. 26, 2002", 6 pgs.
"U.S. Appl. No, 09/493,506 Notice of Allowance mailed Jun. 5, 2003", 8 pgs.
"U.S. Appl. No, 09/493,506 Response filed Feb. 26, 2003 to Non Final Office Action mailed Nov. 26, 2002", 4 pgs.
"U.S. Appl. No. 09/493,506 Response filed Apr. 20, 2001 to Final Office Action mailed Jan. 30, 2001", 6 pgs.
"U.S. Appl. No. 09/493,506 Response filed May 16, 2003 to Final Office Action, mailed Mar. 18, 2001", 4 pgs.
"U.S. Appl. No. 09/493,506 Response filed Jun. 26, 2002 to Non Final Office Action mailed Mar. 26, 2002", 14 pgs.
"U.S. Appl. No, 09/493,506 Response filed Oct. 15, 2002 to Final Office Action mailed Aug. 12, 2002", 5 pgs.
" U.S. Appl. No. 09/493,506 Response filed Nov. 7, 2000 to Non Final Office Action mailed Sep. 15, 2000", 7 pgs.
"U.S. Appl. No. 09/493,506 Response filed Dec. 10, 2001 to Advisory Action mailed Nov. 30, 2001", 9 pgs.
"U.S. Appl. No. 10/650,211 Non Final Office Action mailed Sep. 8, 2004", 20 pgs.
"U.S. Appl. No. 10/650,211 Notice of Allowance mailed May 2, 2005", 11 pgs.
"U.S. Appl. No. 10/650,211 Response filed Dec. 3, 2004 to Non Final Office Action mailed Sep. 8, 2004", 9 pgs.
"U.S. Appl. No. 10/752,385 Final Office Action mailed Jul. 6, 2007", 29 pgs.
"U.S. Appl. No. 10/752,385, Response filed Sep. 6, 2007 to Final Office Action mailed Jul. 6, 2007", 8 pgs.
"WebSTAR Security Toolkit: Troubleshooting", http://www.stamine.com/support/qa/webstarssl/ssltroubleshoot.html, 1-2, 1995.
Nettleton, Chris, "GCC-ERC32 User's Guide C/C++ Compilation System for Spacecraft Microprocessors", *1.6. Options to Request or Suppress Warnings*, http://www.xgc.com/manuals/gcc-erc32-ug/p2node8.html, http://www.xgc.com/manuals/gcc-erc32-ug/book-1.html, (1999).

* cited by examiner

TECHNIQUES FOR SECURELY ACCELERATING EXTERNAL DOMAINS LOCALLY

PRIORITY

The present invention is a continuation-in-part of commonly assigned and co-pending U.S. application Ser. No. 10/784,440, filed on Feb. 23, 2004 and entitled: "Techniques for Managing and Accelerating Data Delivery." U.S. application Ser. No. 10/784,440 is a continuation-in-part to co-pending and commonly assigned U.S. application Ser. No. 10/650,211 filed on Aug. 28, 2003, entitled: "Secure Intranet Access," and now issued as U.S. Pat. No. 6,950,936, the disclosure of which is incorporated by reference herein. Ser. No. 10/650,211, Now issued U.S. Pat. No. 6,950,936 is a continuation of Ser. No. 09/493,506, filed Jan. 28, 2000, now issued U.S. Pat. No. 6,640,302. Furthermore, U.S. Pat. No. 6,640,302 is a divisional of Ser. No. 09/268,795, filed Mar. 16, 1999, now issued U.S. Pat. No. 6,081,900.

FIELD OF THE INVENTION

The invention relates generally to network security, and more specifically to techniques for securely and locally accelerating data delivery associated with external domains.

BACKGROUND OF THE INVENTION

A popular technique for accelerating external domains in a non-secure manner is through the use of site acceleration. Traditionally, to accelerate a complete domain, each site of a domain was associated with a reverse proxy which accelerated and managed data delivery for a particular site of that domain. A reverse proxy resides within the local environment of a site that is being accelerated.

In addition to reverse proxies, there are forward and transparent proxies which are used locally to cache and accelerate data to clients. A forward proxy is a service that a local client knows about and is configured to directly interact with when the client requests a resource of an external domain. A transparent proxy is a service that the local client is unaware of and is unknowingly routed to when the local client requests a resource of the external domain.

Data acceleration occurs by the proxies maintaining caching data associated with the external domain within the local environment of the client. The client experiences improved data delivery and response time because data associated with needed resources or services of the external domain are housed locally within the proxies and vended to the client when needed. Thus, in many instances, the data needed by a client is locally available before the client requests that data and communication with a resource of the external domain is not needed at the time that the client makes the requests.

A domain is a logical collection of sites, resources, or services all identified by a common portion of an Internet Protocol (IP) address. For example, the site www.novell.com identifies a domain name of novell.com, which translates into a specific hierarchical portion of an IP address. The domain novell.com can be associated with a plurality of sites (services or resources), such as: sales.novell.com, support.novell.com, and access.novell.com. The services and resources can be further organized within specific sites associated with the domain.

Conventionally, to accelerate the entire domain of novell.com a reverse proxy is needed for each separate site of the domain. Recent technologies introduced by Novell, Inc. of Provo, Utah permit a single domain accelerator to be configured, such that all sites of a domain can be accelerated by a single service; rather than achieving acceleration via a plurality of separately configured reverse proxies.

Some domains are associated with secure communications, such as Hyper Text Transfer Protocol (HTTP) over Secure Sockets Layer (SSL) or Transport Layer Security (TLS), referred to as HTTPS. Secure communications are generally not cached in the local environments of clients, rather, the proxies establish a secure communications tunnel with the secure domains, sites, services, or resources and the proxies establish a secure communications tunnel with the clients. As a result, local data acceleration associated with secure communications has generally not been available in the networking arts, since secure communications data is not locally cached.

However, recent techniques, such as the ones described in U.S. application Ser. No. 10/784,440 entitled "Techniques for Managing and Accelerating Data Delivery" has changed this by providing techniques for securely accelerating remote sites within the local environments of clients.

Conventionally, external domains have been securely accelerated through the use of reverse proxies. A reverse proxy resides in the external domain and is external to the client and the client's environment. A reverse proxy provides more management benefits to the external domain than it provides acceleration benefits to the client. This is so, because the data contents of the reverse proxy's cache for the external domain are not cached within the local environments of requesting clients.

Thus, improved techniques for securely managing and accelerating external domains within local environments of clients are needed.

SUMMARY OF THE INVENTION

In various embodiments of the invention, techniques are presented for securely managing and accelerating external domains within local environments of clients. External domains which securely communicate with clients using secure communications delegate their data delivery and management to local domain accelerators that reside in the local environments of the clients.

The local domain accelerators vend certificates and data on behalf of the external domains. That is, the local domain accelerator appears to the client to be an external domain. Communication between the local domain accelerator and the client occurs via a local secure communications channel using secure communications. Additionally, communication between the local domain accelerator and the external domain occurs over a secure communications channel using secure communications. The local domain accelerator acquires and caches data associated with sites, services or resources of the external domain. Thus, in many instances, when a client requests data from the external domain, that data is available within the cache of the local domain accelerator and can be vended to the client. In this manner, data is securely accelerated to the client from within the local environment of the client.

DETAILED DESCRIPTION OF THE INVENTION

As used herein and below a "client" is an electronic application, service, resource, or system which may be automated or may be manually interacted with by an end-user. Similarly, a proxy is a device, resource, service, system, or combinations thereof which act as an intermediary on behalf of clients as the clients interact with external domains. A proxy can be a forward proxy, which means the clients are configured to known about the proxy and configured to directly interact with the proxy. A proxy can also be transparent, which means the clients are not preconfigured to interact with the proxy, but some other service or device (e.g., router, hub, bridge, switch, etc.) detects communications directed to or originating from the clients and directs them to the transparent proxy. In some embodiments, a single proxy can act as a forward proxy for some clients and as a transparent proxy for other clients.

An external domain is a local group of remote sites, services, or resources, which share some portion of an IP address with one another. That is, the remote sites, services, or resources have a common portion of their IP addresses which overlap. A remote site is a service, application, system, or resource with which the client desires to interact with in a secure manner for purposes of acquiring data or information from that remote site. In order for the client to interact with a specific remote site, service, or resource, the client makes a request which has a site name or an IP address that identifies the external domain as well as the desired remote sites, services, or resources. In some embodiments, requests are made via SSL through a World-Wide Web (WWW) browser and identified within a Uniform Resource Locator (URL) or Uniform Resource Identifier (URI). The URLs or URIs include the site names or the IP addresses which identify the external domains.

The phrases "local networking environment" and "external (remote) networking environment are presented herein and below. Local networking environment refers to physical or logical network devices and services which are configured to be local to the clients and which interface with the clients. This does not mean that any particular local networking environment of a particular client physically resides in the same geographic location of the client or proximately resides within the same geographic location of the client, although in some embodiments this can be the case. Local networking environments can be dispersed geographically from the physical location of the client and form a logical local networking environment of the client. An external networking environment is a network which is not considered local to the client. An external domain is associated with external or remote networking environments, these external or remote networking environments are considered external and remote vis-à-vis a client's local networking environment.

Secure communications refer to communications that require specific secure protocols (e.g., HTTPS, SSL/TLS, etc.), which are communicated over predefined ports (e.g., 443, etc.) associated with communication devices. In many cases data communication using secure communications requires encryption. In some instances this encryption uses Public and Private Key Infrastructure (PKI) techniques and which may also use digital certificates and digital signatures. Insecure communications refer to communications that use insecure protocols (e.g. HTTP, etc.) and which use different defined ports (e.g., 80, etc.) of communication devices from that which are used with secure communications.

Data acceleration refers to the ability to cache data in advance of a need or request for that data. Any conventional caching services and managers can be used in the caching techniques presented herein and below with embodiments of this invention. Thus, by way of example, a cache manager can determine when to flush certain data from a cache and determine when certain data residing within the cache is stale and needs refreshed or updated. Generally, data is accelerated with caching techniques because the cache resides closer to a client and houses needed data in the local network of the client which is more quickly referenced and accessed. Thus, if a request for particular data can be satisfied from a local cache, a requesting client experiences a faster response time for that data and it appears to the client as if the data has been accelerated to satisfy a data request.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

Figure 1:
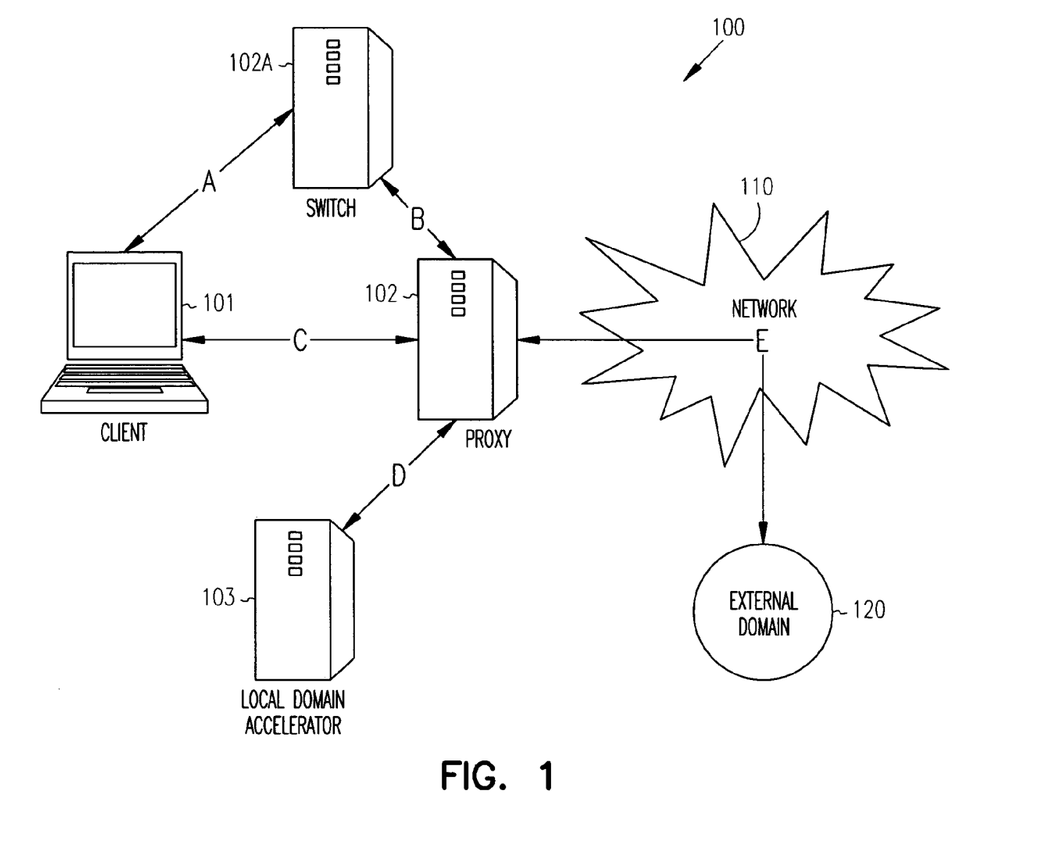
FIG. 1 is a diagram representing an architectural layout for a secure external domain acceleration system.

FIG. 1 is a diagram representing one example architectural layout 100 for a secure external domain acceleration system. The architecture 100 is implemented within a distributed client-server architecture. The purpose of the architecture 100 is to demonstrate how various entities can be configured and arranged for interacting, managing, and accelerating external domains over networks in local environments of requesting clients 101.

The architecture 100 includes a client 101, a proxy 102, optionally a switching device or logic 102A, and a local domain acceleration service 103. The client 101, the proxy 102, and the local domain acceleration service 103 are configured within a physical or logical local networking environment with respect to one another.

The proxy 102 can be a transparent proxy, a forward proxy, or both a transparent proxy and forward proxy. Initially, the proxy 102 is configured by an administrator with a list of external domains 120 for which the proxy 102 creates a local domain accelerator 103 for each of the unique external domains 120 that are being locally accelerated. The proxy 102 handles secure requests received from the client 101 for a site, service, or resource of an external domain 120. If the proxy 102 is a transparent proxy the request from the client 101 is received via A and B through switch or router 102A. If the proxy 102 is a forward proxy the request from the client 101 is received directly via C.

The proxy 102 in response to a received request for an external domain 120 checks its list of valid domains for which a local domain accelerator 103 is available for locally accelerating the data associated with sites, services, and resources of the external domain 120. The proxy 102 listens for secure requests directed toward the external domain 120. When that secure request is detected, the proxy 102 establishes a secure channel between the requesting client 101 and the local domain accelerator 103.

In one embodiment, this is achieved by the proxy 102 using an anonymous SSL handshake to establish a secure channel between the client 101 and the proxy (e.g., via C in FIG. 1). This is a temporary secure channel established to get the initial request. A host header of the initial request can be used to acquire the identity of the external domain 120 associated with the initial request. The external domain 120 houses the site, resource, or service for which the request desires. Further, the site, resource, or service has data which the request desires. Once the proxy 102 identifies the external domain 120, a new SSL handshake is requested so the appropriate domain certificate is returned. That domain certificate is associated with the identity of the needed external domain 120 and is acquired locally via the local domain accelerator 103. At this point, the anonymous connection is discontinued and switched to the local domain accelerator 103 via D, such that the proxy 102 has established a local secure communications session between the requesting client 101 and the local domain accelerator 103.

The local domain accelerator 103 vends certificates on behalf of the external domain 120 and vends data on behalf of sites, services, and resources associated with the external domain 120. The local domain accelerator 103 communicates securely with the external domain 120 and its sites, service, and resources via D and E. The proxy 102 establishes a secure communications channel between the services, sites, and resources of the external domain 120 via E over a network 110. This establishes an external secure communications session between the local domain accelerator 103 and the external domain 120.

The local domain accelerator 103 presents itself and communicates with the requesting client 101 within the client's local networking environment via C-D or A-B-D in FIG. 1. The client 101 believes that it is directly communicating with an external domain 120 and one or more of its associated sites, services, or resources. This occurs because the local domain service 103 uses secure communications and is capable of vending certificates associated with the identity of the external domain 120.

The external domain 120 can have its certificate which it provides to the local domain accelerator signed by a Certificate Authority (CA), such that by providing the trusted root of the CA to the local domain accelerator 103, the established secure channel between the external domain 120 and the local domain accelerator 103 is made more secure. This is so, because no other authority could have signed the certificate sent by the external domain 120 during the SSL handshake. In some embodiments, all communications between the external domain 120 and the local domain accelerator 103 can be mutually signed in order to provide even more security with communications between the external domain 120 and the local domain accelerator 103.

Once a secure communication channel between the external domain 120 and the local domain accelerator 103 is established, the local domain accelerator acquires data from sites, resources, and services controlled by the external domain 120 and houses and manages that data in a cache that is within the local networking environment of the client 101. In some embodiments, the cache and caching services are provided by the proxy 102 to the local domain accelerator for purposes of managing and accelerating the delivery of that data. Thus, the entire external domain 120 can be managed and locally accelerated by the local domain accelerator 103.

The local domain accelerator 103 can vend the certificate and data associated with the external domain 120 in a variety of manners. For example, the local domain accelerator 103 can house the data associated with sites, services, or resources of the external domain 120 in a decrypted format. In this scenario, a client that requests data from the external domain 120 is provided the desired data from the local cache in an encrypted format that is encrypted with the SSL session keys (session keys used between the client 101 and the local domain accelerator 103) along with a certificate identifying the local domain accelerator 103 as the external domain 120.

In other embodiments, the data may be housed within the local cache in an encrypted format, which is decrypted when needed, and then re-encrypted with the SSL session key of the client 101 and the local domain accelerator 103 and delivered in the re-encrypted format to the client 101 along with a certificate that presents the local domain accelerator 103 as the external domain 120. Thus, the local domain accelerator 103 can natively house data it receives from the external domain 120 in decrypted or encrypted formats and can vend that data to the client 101 in encrypted formats expected by the local secure communications session along with a certificate that indicates to the client that the communication is coming from the external domain 120.

The client 101 believes that it is securely communicating with specific resources, services, or sites of an external domain 120 and the client 101 experiences accelerated data delivery. Data delivery is accelerated because the local domain accelerator 103 acquires or pre-fetches desired data and vends it from the local cache. In this manner, an external domain 120 is locally accelerated in a secure fashion to the client 101.

The architecture 100 of FIG. 1 can be achieved with minimal changes to existing networking architectures. Existing proxies are configured to inspect secure communication requests in order to identify the targeted external domains 120. If a target external domain 120 is associated with a local domain accelerator 103, then the request for secure communications is passed from the proxy 102 to the identified local domain accelerator 103. The local domain accelerator 103 translates and manages secure communications received from the sites, services, or resources of the external domain 120 into secure communications expected by the client 101.

Figure 2:
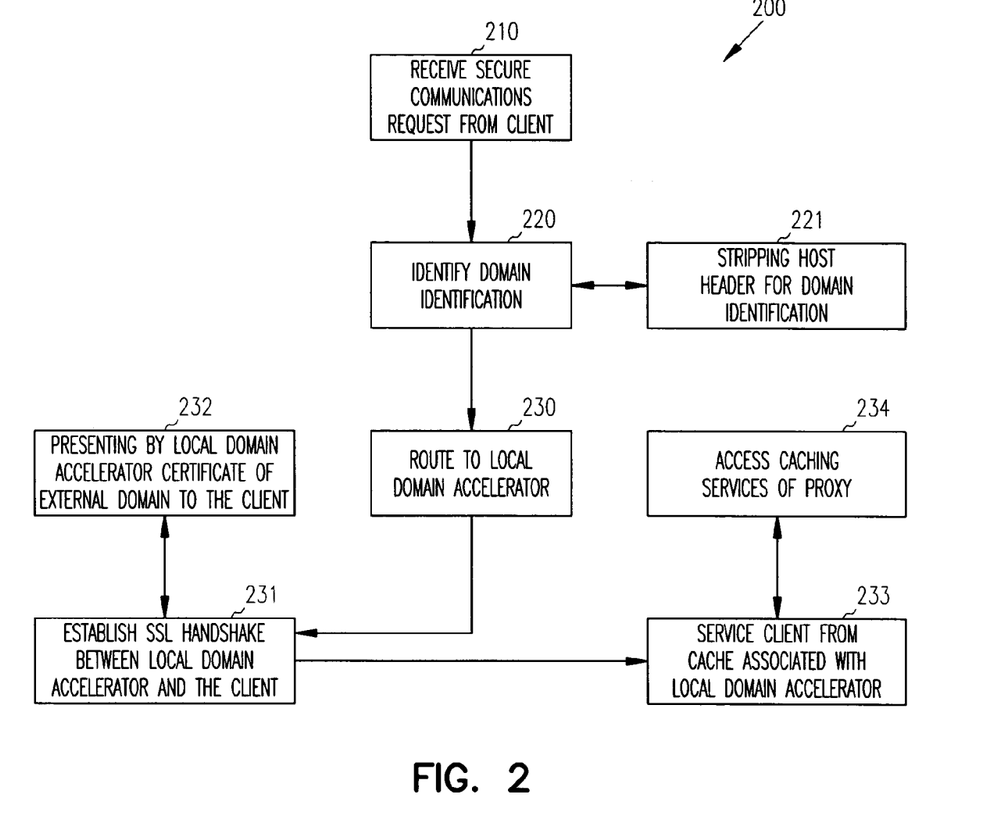
FIG. 2 is a flowchart representing a method for securely accelerating an external domain locally.

FIG. 2 is a flowchart of one method 200 for securely accelerating an external domain over a network and within a local networking environment of a client. The method 200 (hereinafter "processing") is implemented in a computer readable and accessible medium. In one embodiment, the processing represents services provided by a proxy 102 and a local domain accelerator 103, such as the services and processing discussed above with respect to the architecture 100 of FIG. 1.

Initially, an architectural layout similar to the architecture 100 of FIG. 1 is configured and arranged. This configures a local networking environment for a client, such that a local domain accelerator is in a position to locally vend data and certificates securely to the client on behalf of an external domain. That data is vended to the client securely (e.g., using SSL, TLS, etc.) from a local cache.

At 210, the processing receives securely (via secure communication protocols) an initial request for a site, service, or resource of an external domain. That initial request can be received directly from the client in cases where the processing is acting as a forward proxy. Alternatively, the initial request can be received indirectly from the client via a router, switch, hub, or bridge in cases where the processing is acting as a transparent proxy. Upon receipt of the initial request the processing establishes a temporary secure communications channel with the client, such as through an anonymous SSL handshake.

At 220, the processing inspects a portion of the request for purposes of acquiring and identifying an external domain name (identifier) associated with the request. When the request is an URL or URI one technique for acquiring the domain name is by stripping from the URL or URI the host header at 221, which provides the domain identification information to the processing. Next, the processing determines if the acquired domain identifier is listed in a lookup table or other data structure as one in which secure communications are being managed and accelerated locally by a local domain accelerator, such as the local domain accelerator 103 described above with respect to the architecture 100 of FIG. 1.

At this point in time, the processing routes the initial client request for a site, resource, or service of the identified external domain to the local domain accelerator at 230. The anonymous and temporary secure communications between the proxy and the client can then be made into an active secure communications session. One technique for achieving this is to establish an SSL or TLS session at 231 where session keys are established between the client and the local domain accelerator for purposes of encrypting and decrypting communications. Furthermore, at 232, the local domain accelerator presents a certificate to the client that identifies the local domain accelerator as the external domain. Now, the client and local domain accelerator have a local secure communications session and the client believes that it is directly interacting with the external domain and its associated sites, services, or resources.

Correspondingly, at 233, the local domain accelerator, which resides in the local networking environment of the client, services the client from local cache during the secure communications session with data acquired from sites, resources, or services of the external domain. In some embodiments, at 234, the local domain accelerator utilizes the caching services associated with the processing (e.g., proxy).

The local domain accelerator populates, flushes, and pre-fetches data from selective sites, services, and resources of the external domain into the local cache. Communications between the local domain accelerator and the external domain occur securely via a secure communications channel during an external secure communications session. In some embodiments, the communications are mutually signed or signed by only one of the parties. The external secure session between the local domain accelerator and the external domain encrypts data using its unique session key, and each party decrypts data using their unique decrypting session key. Encryption and decryption typically takes place using public-private key pairs, such that decryption of the local domain accelerator occurs with a public key of the external domain and a private key of the local domain accelerator. Similarly, decryption of the external domain occurs with a public key of the local domain accelerator and a private key of the external domain.

When the local domain accelerator vends data during its local secure session with the client from the local cache, the data which was pre-acquired from the external domain is translated into an encrypted format that is being used with that local secure session in manners similar to what was discussed above. The difference is that the session keys for the local secure session between the client and the local domain accelerator are different from the session keys of the external secure session being used between the local domain accelerator and the external domain. The local domain accelerator also presents a certificate to the client which informs the client that the local domain accelerator is the external domain.

The techniques of the method 200 permit entire external domains or collections of external domains to be locally accelerated and vended within the local networking environments of clients. Thus, data management responsibilities of external domains can be delegated to trusted local domain accelerators and data acceleration occurs within the local networking environments of the clients. As a result, clients experience improved data delivery for sites, resources, and services associated with external domains while still maintaining and using traditional secure communications to acquire that data.

Figure 3:
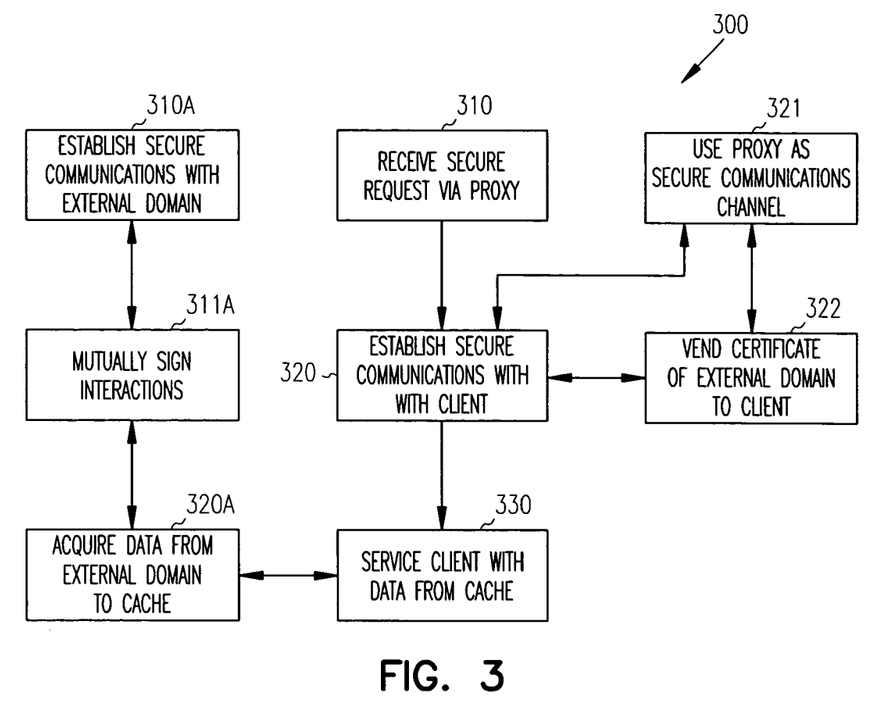
FIG. 3 is a flowchart representing another method for securely accelerating an external domain locally.

FIG. 3 is a flowchart of another method 300 for securely accelerating the delivery of data associated with external domains within the local networking environments of requesting clients. The method 300 (hereinafter "processing") is implemented in a computer readable and accessible medium within the local networking environment of a client, where the client, and a needed service, site, or resources of an external domain, desire to interact securely with one another. In one embodiment, the processing reflects the services or operations which are performed by a proxy 102 and a local domain accelerator 103 associated with the architecture 100 of FIG. 1.

The processing can be a forward proxy, transparent proxy, or both a forward proxy and transparent proxy. Initially, at 310, the processing (proxy) receives a secure communications request for a specific site, resource, or service of a specific external domain. This initial contact with the processing creates a temporary and anonymous SSL handshake which is subsequently converted into a more permanent SSL handshake when the processing contacts a needed local domain accelerator that can vend to the client a certificate of the external domain. That certificate identifies the local domain accelerator as the external domain as far as the client is concerned and permits the establishment of a local secure communications session with the client at 320.

At 310A, concurrent with, prior to, or after the processing facilitates the local secure communications session between local domain accelerator, an external secure communications session is established via the processing between the external domain and the local domain accelerator. In some embodiments, at 311A, communication during the external secure communications session can be mutually signed for added security or unilaterally signed by at least one of the parties. Of course, in other embodiments, no signing of communications is needed at all during the external communications session.

During the external secure communications session, the local domain accelerator acquires data from selective or all sites, services, and resources controlled by the external domain and populate and manage that data in a local cache at 320A. In some embodiments, the local cache and caching services are existing and conventional techniques that are provided by the processing to the local domain accelerator. Data sent and received during the external secure communications session is encrypted and decrypted using the external secure sessions' keys.

In one embodiment, at 321, the processing (proxy) facilitates the creation of the external secure communications session by acting as a conduit between the local domain accelerator and the external domain and by creating a secure communications channel for the external secure session to proceed.

At 322, the local domain accelerator also maintains a separate and unique local secure communications session with the client during which a certificate of the external domain is vended or presented to the client that identifies the local domain accelerator as the external domain as far as the client is concerned. During the local secure communications session data associated with services, resources, or sites of the external domain is encrypted and decrypted between the local domain accelerator and the client using their unique local secure sessions' keys. In this way, the local domain accelerator translates encryption of the external secure communications session into encryption understood and needed by the client for the local secure communications session.

Once the two secure communications sessions are established, such that the local domain accelerator is the only party participating in both sessions, the local domain accelerator can service the client and its requests for data from the local cache at 330. In this way, the local domain accelerator acts as a secure external domain accelerator on behalf of services, resources, and sites associated with the external domain. In a sense, the local domain accelerator becomes a local reverse proxy for the external domain. A single external domain can delegate and interact with multiple local domain accelerators where each local domain accelerator is associated with accelerating data on behalf of the external domain in different client domains.

Figure 4:
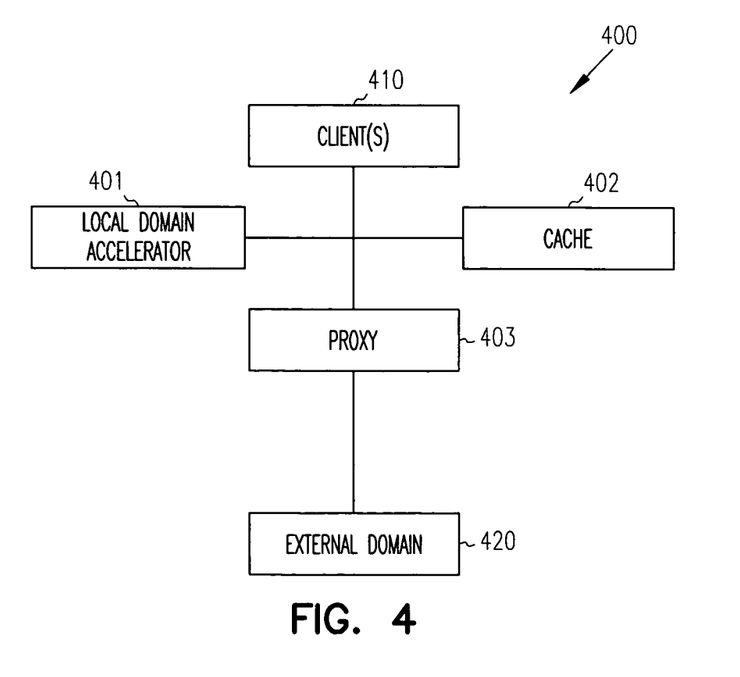
FIG. 4 is a diagram representing a secure external domain acceleration system.

FIG. 4 is diagram representing a secure external domain acceleration system 400. The secure external domain acceleration delivery system 400 is implemented in a computer readable and accessible medium and operates over one or more networks. The networks can be hardwired, wireless, or a combination of hardwired and wireless. In one embodiment, various processing aspects which were described above with respect to the methods 200 and 300 of FIGS. 2 and 3, respectively, are implemented within the secure external domain acceleration system 400.

The secure external domain acceleration system 400 includes a local domain accelerator 401, a cache 402, and a proxy 403. In some embodiments, the cache 402 is integrated into or forms a logical part of the proxy 403. In other embodiments, the local domain accelerator 401 can be integrated into or form a logical part of the proxy 403 as well. Moreover, in one embodiment, the cache 402 is uniquely associated with or integrated with the local domain accelerator.

The proxy 403 can be a forward proxy or a transparent proxy. Alternatively, the proxy can be designated as either a forward proxy or a transparent proxy based on how it interacts with a specific client 410. In this way, the proxy 403 need not exclusively be either a forward or transparent proxy, but can in some arrangements be both a forward proxy and a transparent proxy.

The proxy 403 facilitates and acts as a conduit for establishing a local secure communications session between the local domain accelerator 401 and one or more local clients 410. Additionally, the proxy 403 facilitates and acts as a conduit for establishing an external secure communications session between the local domain accelerator 401 and an external domain 420. The local domain accelerator 401 is the only participant which interacts with both secure sessions and in this manner acts as a translator between data being migrated between different sessions.

The external secure communications session can be established before the local secure communications session, established concurrent with the local secure communications session, or established after the local secure communications session. Delivery of data associated with sites, services, or resources of the external domain 420 occurs during the local secure communications session and is vended by the local domain accelerator 401 from the cache 402. That is, the local domain accelerator 401 uses its external secure communications session to pre-acquire and pre-fetch needed data into the cache 402, such that when a local client 410 requests that data during the local secure communications session the local domain accelerator 401 is in a position to translate that data from the cache into an encrypted format needed by the local session and delivery it to the requesting client 401.

Thus, the secure external domain acceleration system 400 processes within the local networking environment of clients 410 for purposes of locally accelerating data delivery to those clients 410 during a locally secure communications session. As a result, clients 410 can now experience accelerated data delivery for entire external domains 420 within their local networking environments. This improves the throughput of data delivery associated with sites, services, and resources of external domains 420 and offloads processing that would normally take place within the networking environments of the external domains 420.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A computer-implemented method residing in a computer-readable medium and processed by a forward proxy for securely accelerating an external domain locally to a client, comprising:

receiving, at the forward proxy, a secure communications request for an external domain from a client;

establishing, at the forward proxy, a secure channel with the client using an anonymous secure socket layer (SSL) handshake, the secure channel is a temporary secure channel;

identifying, at the forward proxy, a domain identification associated with the request by inspecting a host header for the request;

discontinuing, by the forward proxy, the temporary secure channel; and routing, by the forward proxy, the request to a local domain accelerator based on the domain identification, the local domain accelerator communicates securely with the external domain via a first set of unique session keys used for the local domain accelerator and the external domain to communicate via encrypted communications with one another and separately the local domain accelerator communicates securely with the client via a second set of unique session keys used for the local domain accelerator and the client to communicate and the first set of session keys and the second set of session keys are different from one another and the client believes communication that the client has with the local domain accelerator is occurring with the external domain because the local domain accelerator vends an external domain certificate to the client during the communication to present itself as the external domain but in fact it occurs with the local domain accelerator via the second set of session keys, and the local domain accelerator caches data from the external domain for servicing the request of the client, and wherein the data is cached and managed via the forward proxy and maintained in encrypted format within cache and then decrypted and re-encrypted using the second set of unique session keys when data from the cache is delivered from the local domain accelerator to the client from the cache to satisfy the request and all communication between the external domain and the local domain accelerator is mutually signed.

2. The method of claim 1 further comprising, establishing a Secure Sockets Layer (SSL) handshake between the client and the local domain accelerator to service the request, wherein the client believes that the handshake is with the external domain.

3. The method of claim 1 wherein receiving further includes intercepting the request that originates from the client for the external domain.

4. The method of claim 1 further comprising, accessing, by the local domain accelerator, caching services for caching and managing the data.

5. The method of claim 1 wherein identifying further includes stripping a host header from the request, wherein the host header is the domain identifier which identifies the external domain.

6. A computer-implemented method residing in a computer-readable medium and processed by a proxy for securely accelerating an external domain locally, comprising:
  receiving a secure request forwarded from a proxy, the secure request originating from a client and destined for an external domain, the proxy acting as both a transparent and forward proxy within a local environment of the client;
  establishing a temporary secure channel between the client and the proxy via an anonymous secure socket layer (SSL) handshake to acquire from a header of the secure request an identity for the external domain and then discontinuing the temporary secure channel;
  establishing a secure communication with the client by providing the client a certificate associated with the external domain, the certificate is for the external domain and is vended to the client to make the client believe the secure interaction is occurring with the external domain, and the secure communication entails using a first set of session keys to communicate securely with the client and the client believes after receiving the certificate that communication is occurring with the external domain; and
  servicing the client with data from local cache that is acquired from the external domain via encrypted communications, and a portion of that data is used to service the secure request, and separate communication is securely established with the external domain using a second set of session keys via the encrypted communications, the first set of session keys different from the second set of session keys, and the data is encrypted within the local cache of the proxy and subsequently decrypted and then re-encrypted and delivered to the client using the first set of session keys via the secure communication with the client and all communication with the external domain to and from the method is mutually signed.

7. The method of claim 6 wherein servicing further includes acting as the external domain when interacting with the client.

8. The method of claim 6 further comprising accessing caching services from the proxy to manage the data in the local cache.

9. The method of claim 6 wherein servicing further includes acquiring at least a portion of the data from the external domain in advance of a subsequent request for that portion of the data, wherein the subsequent request is issued from the client.

10. The method of claim 6 wherein servicing further includes interacting securely with the external domain to acquire the data housed in the local cache.

11. An external domain acceleration system, comprising:
  a proxy configured as both a transparent and forward proxy; and
  a local domain accelerator implemented in a computer-readable medium and to process on the proxy, a client securely requests an external domain and the proxy routes the request to the local domain accelerator, a secure request between the client and the proxy occurs via an anonymous secure socket layer (SSL) handshake via a temporary secure channel that is discontinued by the proxy once the proxy acquires an identity for the external domain from a header of the secure request; the local domain accelerator securely communicates with the external domain via encrypted communications and caches data in a local cache of the proxy in an encrypted format which is used to service the client via secure communications between the local domain accelerator and the client by decrypting and then re-encrypting the data from the local cache using a first set of session keys, and the local domain accelerator securely communicates with the client using the first set of session keys and securely communicates with the external domain using a second set of session keys via the encrypted communications, the first set of session keys are different from the second set of session keys, and wherein the client believes communication is occurring between the client and the external domain because the local domain accelerator vends an external domain certificate to the client during the communication to present itself as the external domain, but in fact communication is occurring between the client and the local domain accelerator via the first set of session keys and all communication between the external domain and the local domain accelerator is mutually signed.

12. The external domain acceleration system of claim 11 wherein the client is a browser application that interacts with the local domain accelerator via Secure Sockets Layer (SSL) communications.

13. The external domain acceleration system of claim 11 wherein the proxy creates a secure communications tunnel between the client and the local domain accelerator and the proxy creates a secure communications channel between the local domain accelerator and the external domain.

14. An external domain acceleration system, comprising:
a local domain accelerator implemented in a computer-readable medium and to process on a forward proxy for a client; and
cache of the proxy, the proxy configured to establish an initial temporary secure channel with the client via an anonymous secure socket layer (SSL) handshake to parse from a header of a secure request an identity for an external domain and then the proxy discontinues the temporary secure channel, the local domain accelerator securely communicates with the client as if the local domain accelerator was the external domain and securely communicates with the external domain via encrypted communications for purposes of acquiring data from the external domain, and wherein the local domain accelerator houses the data in and vends the data from the cache to the client, the data housed in the cache in an encrypted format, and wherein the local domain accelerator securely communicates with the client via a first set of session keys and separately securely communicates with the external domain using a second set of session keys via the encrypted communications and the first set of session keys is different from the second set of session keys and the client believes that the client is communicating with the external domain because the local domain accelerator vends an external domain certificate to the client during the communication to present itself as the external domain, but in fact the client is communicating with the local domain accelerator using the first set of session keys and all communication between the external domain and the local domain accelerator is mutually signed.

15. The external domain acceleration system of claim 14 further comprising a proxy that acts as a secure conduit between the client and the local domain accelerator and a secure conduit between the local domain accelerator and the external domain.

16. The external domain acceleration system of claim 14 wherein the local domain accelerator and the external domain exchange certificates with one another during communications with one another.

17. The external domain acceleration system of claim 14 wherein the client is a browser and uses Secure Sockets Layer (SSL) communications to attempt to directly communicate with the external domain, the communications are intercepted and forwarded to the proxy and the proxy forwards the communications to the local domain accelerator where the local domain accelerator presents itself securely to the client as if it were the external domain.

18. The external domain acceleration system of claim 14 wherein the external domain includes a plurality of external sites having a plurality of services.

\* \* \* \* \*